Dec. 31, 1963  G. E. EILERMAN  3,116,192
GLASS FIBER TREATMENT
Filed July 7, 1959
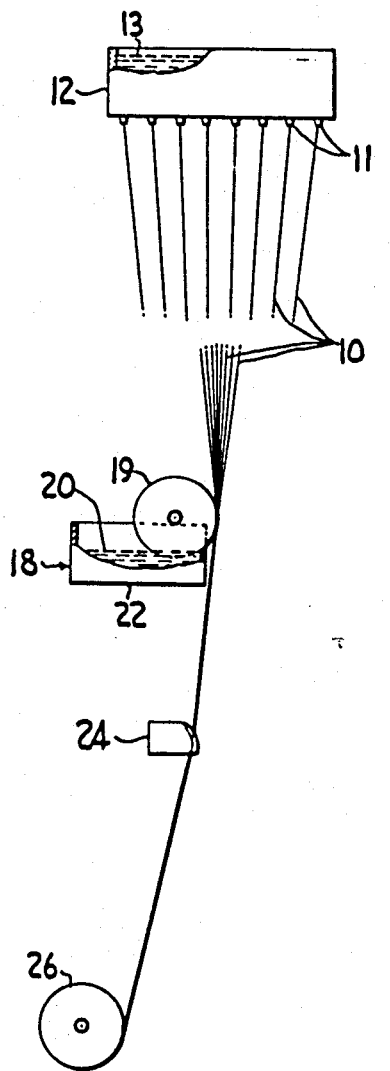
INVENTOR.
GEORGE E. EILERMAN
BY Oscar L. Spencer
ATTORNEY

United States Patent Office 3,116,192
Patented Dec. 31, 1963

3,116,192
GLASS FIBER TREATMENT
George E. Eilerman, Perrysville, Pa., assignor to Pittsburgh Plate Glass Company, Allegheny County, Pa., a corporation of Pennsylvania
Filed July 7, 1959, Ser. No. 825,444
6 Claims. (Cl. 156—167)

The present invention relates to a glass fiber treatment and it has particular relation to a size for treating glass fibers which are to be woven into cloth and used as a reinforcement for resins. This application is a continuation-in-part of my copending application Serial No. 752,412, filed August 1, 1958, now U.S. Patent No. 2,994,619.

A glass fiber strand is composed of a multiude of fine glass filaments which are formed by being drawn at a high rate of speed from molten cones of glass located at the tips of small orifices in a bushing such as shown in U.S. Patent No. 2,133,238. During formation, the filaments are coated while moving at a speed of the order of 5,000 to 20,000 feet per minute with a size which contains a binder to give the strand integrity for workability, i.e., for twisting, plying and weaving. If the strand does not have proper integrity, fuzzing occurs during these operations and eventually the strand breaks. The size also contains a lubricant for the filaments to prevent destruction of the strand by abrasion of the individual filaments against each other or against fiber handling equipment.

It is common practice to use glass fiber strands and glass fiber cloth as a reinforcement for resins. For such use, the glass fibers are coated with a coupling agent or finish material which makes the surface of the glass fibers hydrophobic and compatible with the particular resin with which they are to be employed. These coupling agents greatly increase the dry and wet flexural strength of the glass fiber-resin laminate.

A number of silane and siloxane materials have been found to be useful as coupling agents. For example, vinyl and allyl halo, alkoxy, amino or acyloxy silanes, their hydrolysis products and polymers of the hydrolysis products are suitable for such use. Some of the silanes are disclosed in U.S. Patents Nos. 2,563,228; 2,688,006; 2,688,007; 2,723,211; 2,742,378; 2,754,237; 2,776,910 and 2,799,598.

When the glass fibers are used in the form of strand, i.e., roving or chopped strands, for resin reinforcement, the coupling agent is usually combined with the size and applied with the size to the fibers during their attenuation and forming. The size employed is usually an aqueous dispersion of a film-forming, synthetic resin latex made by aqueous emulsion polymerization of an ethylenic monomer, for example, polyvinyl acetate latex, and a textile lubricant or softener. Roving is formed by combining a number of strands in parallel form and winding the strands on a tubular support in a manner such that the combined strands may be unwound and used to form woven roving or chopped strands. It is therefore necessary that the strand have good integrity and resistance to fuzzing during the steps employed to make the roving and fabricate it into forms suitable for use as a resin reinforcement.

When roving is formed and fabricated for resin reinforcement, it is necessary that the roving have a certain degree of hardness. The roving should be hard and flexible, but not brittle. Ordinarily, when it is desired to make a strand or roving harder, the procedure is to increase the amount of binder in the size. There is a limit to the amount of binder which can be applied in the size during the formation of the strand because too much binder on the strand will render the strand difficult to remove from the forming package. It has been found that the use of the maximum allowable amount of binder, such as polyvinyl acetate latex, in a silane-containing size does not render the strand or roving sufficiently hard. It is therefore an object of this invention to provide a silane size for application to strands during their formation to enable the production of a relatively hard roving. The term "hard roving" means a roving which has good strand integrity and which feels hard to the touch as contrasted to a soft roving which feels soft to the touch.

Static electricity on the roving causes it to separate into the individual strands and become unruly in fabrication and use. It is therefore a further object of the invention to provide a hard silane roving with reduced static properties.

These and other objects of the invention are accomplished by treating glass fiber strands during their formation with a size containing a binder, a lubricant or softener, an unsaturated silane such as vinyltriacetoxy silane and a water soluble melamine formaldehyde resin. A typical example of the size is as follows:

*Example I*

| | Parts by weight |
|---|---|
| Polyvinyl acetate latex (55% by weight solids) | 93.7 |
| Vinyltriacetoxysilane | 8.8 |
| Pelargonic acid amide solubilized in water with acetic acid | 4.0 |
| Aqueous solution of melamine formaldehyde resin (65% solids) | 9.5 |
| Water | 1842 |

Two hundred gallons of the glass fiber size can be made by dissolving the textile softener in about 70 gallons of water maintained at a temperature of about 130 to 160° F., preferably at a temperature of 145 to 150° F. The solution of textile softener and water is thoroughly mixed by stirring. The vinyltriacetoxysilane is then poured into the above mixture and the resultant mixture is stirred for 5 to 10 minutes to insure complete mixing. Approximately 70 gallons of water at a temperature of about 65 to 70° F. is then added while the mixing continues. Polyvinyl acetate latex is next poured into the mixture and stirred for about 5 to 10 minutes to provide complete mixing. The solution of the melamine-formaldehyde resin is then dissolved in an equal amount of water and the solution is added to the mixture prepared as described above. Sufficient water to make 200 gallons of the solution is finally added.

The sizing solution thus prepared has a pH of about 4.1 to 4.5 and is stable for long periods of time, for example, a week or longer, with respect to the maintenance of the dispersion of the latex in the size and the prevention of the condensation and precipitation of the silane in the size. The amounts of the various ingredients are given for purposes of illustration and are not to be considered as limitations on the invention. Various amounts and concentrations of aqueous dispersion of the latex, silane, melamine-formaldehyde resin and textile softener can be used to prepare the size. The solids content of the size is about 3.3 to 3.9 percent by weight.

The FIGURE of the drawing illustrates a schematic view of applying sizing solution to the individual fibers during their formation. The sizing solution is applied to the individual fibers 10 just after their emergence from orifices 11 in an electrically heated, platinum alloy bushing 12 containing molten glass 13. The sizing solution is applied to the filaments prior to or at the same time they are grouped together to form a strand by means of a roller applicator 18 which is composed of a rotating roller 19 partially submerged in the sizing solution 20 contained in a reservoir 22. Such an applicator is shown in more detail in U.S. Patent No. 2,728,972. The fibers are grouped into a strand by a graphite guide 24 and wound around a forming tube 26 rotating at approximately 7500 r.p.m. to produce a strand travel of approximately 12,000 to 15,000 feet per minute. Other methods of applying the size to the strand of glass fibers, such as a pad applicator, may be employed and the strand may be formed by means other than winding on the forming tube, such as by means of a pair of rotating wheel pullers which direct the strand into a suitable collecting device.

The glass fiber strands wound on the forming tube 26 are then dried. This may be done by heating them while on the forming tube at a temperature and for a length of time sufficient to remove substantially all of the water, for example at about 240 to 300° F., preferably 275° F., for 8 hours. This drying causes the silane to fix itself to the glass surface and to produce the degree of strand integrity and hardness required for forming the strand into roving and fabricating the roving into proper form for resin reinforcement. The solids content of size on the strand averages about 0.5 to 2.0 percent by weight.

The glass fiber size can be made by using other film-forming, glass fiber binders in place of the polyvinyl acetate latex. These binders are latices, i.e., aqueous dispersions of synthetic resins made by aqueous emulsion polymerization of ethylenic monomers such as the various acrylates which are esters of acrylic and methacrylic acid and an aliphatic alcohol having 1 to 6 carbon atoms including, for example, methyl methacrylate, and methyl acrylate, vinyl chloride, styrene, acrylonitrile, chlorovinyl acetate, butadiene, vinylidene chloride and various copolymers of the above monomers such as butadiene-styrene, butadiene-acrylonitrile, vinyl chloride- vinyl acetate copolymers and like materials which can be employed in latex form in aqueous dispersions as binders for glass fiber strands. These latices generally have an average particle size of 0.1 to 5 microns.

A plasticizer may be used in the size with latices which tend to deposit as brittle or discontinuous films although ordinarily a plasticizer is not used for it tends to soften the roving. For example, a plasticizer may be used with latices of polyvinyl acetate, polyvinyl chloride, the polyacrylates and polystyrene, whereas the plasticizer is generally not used with butadiene-styrene latex. Frequently the latex as purchased from the manufacturer will have a small amount of plasticizer in it. The plasticizer may be any known plasticizer for the various latices such as dibutyl phthalate, tricresyl phosphate, dioctyl phthalate, diisooctyl phthalate and other esters which are conventionally used as plasticizers. Approximately 1 to 5 percent by weight of the latex on a solid basis is employed in the size. Approximately 0.5 to 5 percent by weight of plasticizer based upon the weight of the solid latex may be employed. Larger amounts may be employed with polyvinyl chloride, polystrene and polyvinylidene chloride latices if needed for proper film forming.

The size contains about 0.3 to 2 percent by weight of an alkenyl silane such as vinyltriacetoxysilane. Greater than 2 percent by weight of the silane can be used, but larger amounts do not materially increase the strength characteristics of the resin laminate.

The textile softener for use in the present invention is a cationic-active, acid solubilized, fatty acid amide. This material is manufactured by the Arnold Hoffman Company under the trade number R1-185A. It is an anhydrous material which is a deep reddish, amber, viscous liquid at room temperature. It is water dispersible and has a pH of 8.9 to 9.4 in a one percent by weight aqueous dispersion. Other commercially available acid solubilized, fatty acid amides are useful as textile softeners in the practice of the invention. These include both saturated and unsaturated fatty acid amides wherein the acid group contains from 4 to 24 carbon atoms. Also included are anhydrous, acid solubilized polymers of the lower molecular weight unsaturated fatty acid amides. The textile softener is employed in an amount approximately 0.1 to 1 percent by weight of the sizing solution.

Another textile softener and lubricant which can be used in the size is an alkyl imidazoline derivative which includes compounds of the class $\mu$-alkyl N-amidoalkyl imidazolines which may be formed by causing fatty acids to react with polyalkylene polyamines under conditions which produce ring closure. These imidazolines are described more fully in U.S. Patent No. 2,200,815. Other suitable imidazolines are described in U.S. Patents Nos. 2,267,965, 2,268,273 and 2,355,837.

The size may contain a wetting agent. The wetting agent is preferably cationic or non-ionic and it may also serve as an additional lubricant. Any material which is conventionally known to be useful as such and will reduce the surface tension of the sizing solution so that it is about 25 to 35 dynes per square centimeter can be used. Such materials include cetyl or stearyl monoamine hydrochloride or acetate, dodecyl amine, hexadecyl amine and secondary and tertiary derivatives of the same, for example, dodecyl methyl amine and salts thereof. Alkyl quaternary ammonium compounds such as trimethyl, stearyl or cetyl ammonium bromides and chlorides and generally any of the amine compounds that dissociate in water systems to provide a positive radical containing a group of more than 8 and preferably 12 or more carbon atoms may be used. Other examples of suitable wetting agents are polyoxyethylene derivatives of a sorbitol fatty acid ester such as polyoxyethylene sorbitan monostearate or polyoxyethylene sorbitan trioleate. The amount of such wetting agent employed generally ranges from about 0.01 to 1 percent by weight of the aqueous sizing solution.

The total solids content of the sizing solution is about 2 to 5.5 percent by weight of the solution. In all events the amounts of the various ingredients should not exceed that amount which will cause the viscosity of the solution to be greater than about 100 centipoises at 20° C. Solutions having a viscosity of greater than 100 centipoises at 20° C. are very difficult to apply to glass fiber strands during their formation without breaking the strand. It is preferred that the viscosity of the size be between 1 and 20 centipoises at 20° C. for best results. The pH of the solution may vary from about 3 to 8 depending upon the sensitivity of the latex to precipitate from the dispersion. The more sensitive the latex is to precipitation, the higher the pH of the solution. It is desired that the sizing solution have a pH of 4 to 5 when polyvinyl acetate is the latex.

The amount of melamine-formaldehyde in the sizing solution is 0.1 to 2.0 percent by weight of solids depending upon the degree of hardness desired in the strand. The hardness permits the strand or roving to resist abrasion as it passes through the various fabricating steps. The melamine-formaldehyde resin in the amounts specified renders the strand hard and flexible, but not brittle. The melamine-formaldehyde resin also increases the wettability of the strand or roving with respect to the resin which the strand or roving is to reinforce. It takes less time for the resin to impregnate the chopped strand mat or roving. The melamine-formaldehyde also reduces the amount of static electricity normally formed on the roving during fabrication and use.

Further examples of the sizing solutions which may be employed in the present invention are listed below:

*Example II*

| | Parts by weight |
|---|---|
| Aqueous dispersion of polyvinyl acetate latex (55% by weight solids) | 125 |
| Vinyltriacetoxysilane | 20 |
| High molecular weight imidazoline (textile softener and lubricant) | 5 |
| Aqueous solution of melamine-formaldehyde resin (65% solids) | 22 |
| Water | 2228 |

Example III

| | |
|---|---|
| Butadiene styrene latex (48% by weight solids) | 108 |
| Vinyltriacetoxysilane | 8.8 |
| Tetraethylene pentamine amide of stearic acid solubilized in water with methacrylic acid | 4.0 |
| Aqueous solution of melamine-formaldehyde resin (65% solids) | 9.5 |
| Water | 1640 |

Example IV

| | |
|---|---|
| Poly methyl methacrylate latex (40% by weight of solids) | 129 |
| Vinyltriacetoxysilane | 8.8 |
| Textile softener (anhydrous acid solubilized, stearic acid amide) | 4.0 |
| Aqueous solution of melamine-formaldehyde resin (65% solids) | 9.5 |
| Water | 1614 |

Example V

| | |
|---|---|
| Polyvinyl acetate latex (55% by weight solids) | 94 |
| Vinyltripropionoxysilane | 8.8 |
| Textile softener (anhydrous acid solubilized, lower molecular weight fatty acid amide) | 4.0 |
| Aqueous solution fo melamine-formaldehyde resin (65% solids) | 10.0 |
| Water | 1912.0 |

Glass fiber strands which have been treated with the sizes described above are heated at a sufficient temperature and for a sufficient length of time to remove substantially all of the water, for example about 240° to 300° F. for 8 hours. The dried strands may then be collected in parallel relation to form roving and the roving may be wound on a tube. The roving may be woven into cloth or chopped into short lengths, i.e., 2 to 5 inches, and formed into a mat by means of conventional preform techniques.

The strands which have been sized and fabricated as described above provide increased flexural strength to resins reinforced with the strands. A chopped strand mat was formed from 60 end roving treated as described in Example I and impregnated with a styrenated polyester resin. The resin was a polymerizable mixture of a styrenated polyester containing about 2 percent by weight of methyl ethyl ketone peroxide. The impregnated mat was cured for about 20 minutes at 180° F. under 15 pounds per square inch pressure and then post-cured at 250° F. for 60 minutes at atmospheric pressure. The resulting laminate had about 36.2 percent by weight of glass and a dry flexural strength of 34,600 pounds per square inch. After a 2 hour immersion in boiling water the flexural strength of the laminate was 33,500 pounds per square inch.

The invention is particularly useful when the glass fibers are to be used as reinforcement for low pressure thermosetting type resins, for example, unsaturated polyester-ethylenic monomer resins such as shown in U.S. Patent No. 2,676,947 granted to Parker. These resins are interpolymers of (A) a polyester of a dihydric alcohol such as ethylene glycol, propylene glycol, 1,3-butylene glycol, diethylene glycol, dipropylene glycol and higher polymers of alkylene glycols, and an alpha, beta ethylenic, dicarboxylic acid such as maleic or fumaric acid with other dicarboxylic acids such as adipic, succinic, azaleic and phthalic acids added and (B) a monomer, soluble in the polyester, containing a terminal ethylenic group, $CH_2=C<$, such as styrene, vinyl acetate, vinyl toluene, allyl esters including allyl acetate, allyl succinate, diallyl phthalate, diallyl cyanurate, triallyl cyanurate, dichloro styrene, etc. The invention is also useful when the glass fibers are to be laminated with other resinous or plastic materials such as polyether or epoxy resins which are condensation polymers of an epihalohydrin and a polyhydroxy phenolic compound and derivatives thereof such as bis-phenol A.

Although the present invention has been described with respect to specific details of certain embodiments thereof, it is not intended that such details act as limitations upon the scope of the invention except insofar as set forth in the accompanying claims.

I claim:

1. A method of forming a hard glass fiber strand which can be fabricated into roving and laminated with a resin which comprises drawing glass streams through orifices in a bushing to form individual glass filaments, moving the filaments away from the bushing at a high rate of speed and forming them into a strand, applying to the filaments while they are moving at this speed an aqueous sizing solution consisting essentially of 1 to 5 percent by weight on a solids basis, of a synthetic resin latex made of an ethylenic monomer, 0.3 to 2 percent by weight of vinyl triacyloxysilane, 0.3 to 2 percent by weight of melamine formaldehyde resin and 0.1 to 1 percent by weight of a textile softener, the total solids content of the solution being 2 to 5.5 percent by weight and the viscosity of the solution being less than 100 centipoises at 20° C., and drying the glass fibers so treated.

2. The method of claim 1 wherein the synthetic resin latex is a polyvinyl acetate latex.

3. The method of claim 1 wherein the vinyl triacyloxysilane is vinyl triacetoxysilane.

4. The method of claim 1 wherein the vinyl triacyloxysilane is vinyl tripropionoxysilane.

5. A method of forming a hard glass fiber strand which can be fabricated into roving and laminated with a resin which comprises drawing glass streams through orifices in a bushing to form individual glass filaments, moving the filaments away from the bushing at a high rate of speed and forming them into a strand, applying to the filaments while they are moving at this speed an aqueous sizing solution consisting essentially of 1 to 5 percent by weight on a solids basis, of a polyvinyl acetate latex, 0.3 to 2 percent by weight of vinyl triacetoxysilane, 0.3 to 2 percent by weight of melamine formaldehyde resin and 0.1 to 1 percent by weight of a textile softener, the total solids content of the solution being 2 to 5.5 percent by weight and the viscosity of the solution being less than 100 centipoises at 20° C., and drying the glass fibers so treated.

6. A method of forming a hard glass fiber strand which can be fabricated into roving and laminated with a resin which comprises drawing glass streams through orifices in a bushing to form individual glass filaments, moving the filaments away from the bushing at a high rate of speed and forming them into a strand, applying to the filaments while they are moving at this speed an aqueous sizing solution consisting essentially of 1 to 5 percent by weight on a solids basis, of a synthetic resin latex made of an ethylenic monomer, 0.3 to 2 percent by weight of vinyl triacyloxysilane, 0.3 to 2 percent by weight of melamine formaldehyde resin and 0.1 to 1 percent by weight of a textile softener, the total solids content of the solution being 2 to 5.5 percent by weight and the viscosity of the solution being less than 100 centipoises at 20° C., drying the treated strands, combining the glass fiber strands in substantially parallel relation to form roving, fabricating the roving into a form suitable for resin reinforcement, combining the fabricated roving with a curable resin and curing the combination to form the reinforced body.

References Cited in the file of this patent

UNITED STATES PATENTS

| | | |
|---|---|---|
| 2,634,285 | Rust et al. | Apr. 7, 1953 |
| 2,688,006 | Steinman | Aug. 31, 1954 |
| 2,688,007 | Steinman | Aug. 31, 1954 |
| 2,723,215 | Biefeld et al. | Nov. 8, 1955 |
| 2,754,237 | Brooks | July 10, 1956 |
| 2,843,560 | Mika | July 15, 1958 |
| 2,927,910 | Cooper | Mar. 8, 1960 |
| 2,994,619 | Eilerman | Aug. 1, 1961 |